United States Patent
Lee

(10) Patent No.: US 9,207,512 B1
(45) Date of Patent: Dec. 8, 2015

(54) METHOD OF MANUFACTURING TRANSPARENT DISPLAY DEVICE USING PRE-TILTED LIQUID CRYSTAL MOLECULES

(71) Applicant: Samsung Display Co., Ltd., Yongin (KR)

(72) Inventor: Gak Seok Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/605,702

(22) Filed: Jan. 26, 2015

(30) Foreign Application Priority Data

May 15, 2014 (KR) .......................... 10-2014-0058442

(51) Int. Cl.
*H01J 9/00* (2006.01)
*G02F 1/139* (2006.01)
*G02F 1/1347* (2006.01)
*G02F 1/1337* (2006.01)
*G02F 1/133* (2006.01)

(52) U.S. Cl.
CPC ............ *G02F 1/1392* (2013.01); *G02F 1/1337* (2013.01); *G02F 1/13306* (2013.01); *G02F 1/13471* (2013.01); *G02F 1/133711* (2013.01); *G02F 1/133788* (2013.01); *G02F 2001/133726* (2013.01)

(58) Field of Classification Search
CPC . G02F 1/392; G02F 1/133711; G02F 1/1337; G02F 1/13471; G02F 1/133788; G02F 1/13306
USPC ............................................................ 445/6
See application file for complete search history.

(56) References Cited

U.S. PATENT DOCUMENTS

2010/0315567 A1 12/2010 Wen et al.
2012/0062527 A1 3/2012 Cheong et al.

FOREIGN PATENT DOCUMENTS

| JP | 4025787 | 12/2007 |
|---|---|---|
| KR | 1020110032216 | 3/2011 |
| KR | 1020110085527 | 7/2011 |
| KR | 1020130072875 | 2/2013 |
| KR | 101290585 | 7/2013 |

*Primary Examiner* — Joseph L Williams
(74) *Attorney, Agent, or Firm* — H.C. Park & Associates, PLC

(57) ABSTRACT

A manufacturing method of a transparent display device including: forming a pixel between a first substrate and a second substrate facing the first substrate, the pixel including a liquid crystal layer disposed between the first and second substrates, applying a first voltage having a frequency lower than a reference frequency to the liquid crystal layer to drive liquid crystal molecules of the liquid crystal layer as positive liquid crystal molecules, applying a second voltage having a frequency higher than the reference frequency to the liquid crystal layer to drive the liquid crystal molecules as negative liquid crystal molecules, and pre-tilting the liquid crystal molecules operated as the negative liquid crystal in a predetermined direction.

18 Claims, 11 Drawing Sheets

METHOD OF MANUFACTURING TRANSPARENT DISPLAY DEVICE USING PRE-TILTED LIQUID CRYSTAL MOLECULES

CROSS-REFERENCE TO RELATED APPLICATION

This application claims priority from and the benefit of Korean Patent Application No. 10-2014-0058442, filed on May 15, 2014, which is hereby incorporated by reference for all purposes as if fully set forth herein.

BACKGROUND

1. Field

Exemplary embodiments relate to a method of manufacturing a transparent display device.

2. Discussion of the Background

In general, a transparent display device displays an image to a user. The transparent display device includes a display panel in which vertical alignment (VA) mode liquid crystal molecules are disposed. The display panel includes a liquid crystal layer, including the liquid crystal molecules, disposed between two polarizers having light transmission axes substantially perpendicular to each other.

When no voltage is applied to the display panel, the VA mode liquid crystal molecules are aligned in a direction substantially vertical to the display panel. Accordingly, light does not transmit through the display panel since the liquid crystal molecules are vertically aligned. When the voltage is applied to the display panel, the liquid crystal molecules are driven, and thus light transmits through the display panel.

The state in which the light does not transmit through the display panel is called a black mode, and the state in which the light transmits through the display panel is called a white mode. The transparent display device operated in the white mode displays the image of the display panel.

A display panel that operates in the black mode during an off state when no voltage is applied to the display panel operates in a normally black mode. A display panel that operates in the white mode during the off state operates in a normally white mode. When the display panel is operated in the normally black mode, a power consumption of the display panel increases since the voltage is continuously applied to the display panel to operate the display panel in the white mode and show the image.

To reduce the power consumption, a phase retardation film (or a quarter wave plate, QWP) is applied to the display panel including the VA mode liquid crystal molecules, and thus, the normally white mode is realized. When the display panel is in the off state, the phase retardation film retards the phase of the light such that the light transmits through the display panel. Accordingly, although the liquid crystal layer including the VA mode liquid crystal molecules is applied to the display panel, the display panel is operated in the normally white mode. However, a transmittance of the light transmitted through the display panel is decreased since the additional phase retardation film is applied to the display panel.

The above information disclosed in this Background section is only for enhancement of understanding of the background of the inventive concept, and, therefore, it may contain information that does constitute prior art.

SUMMARY

Exemplary embodiments provide a method of manufacturing a transparent display device capable of improving a light transmittance therethrough.

Additional aspects will be set forth in the detailed description which follows, and, in part, will be apparent from the disclosure, or may be learned by practice of the inventive concept.

Exemplary embodiments of the inventive concept provide a method of manufacturing a transparent display device, including forming a pixel between a first substrate and a second substrate facing the first substrate, the pixel comprising a liquid crystal layer disposed between the first and second substrates, applying a first voltage having a frequency lower than a reference frequency to the liquid crystal layer to drive liquid crystal molecules of the liquid crystal layer as positive liquid crystal molecules, applying a second voltage having a frequency higher than the reference frequency to the liquid crystal layer to drive the liquid crystal molecules of the liquid crystal layer as negative liquid crystal molecules, and pre-tilting the liquid crystal molecules operated as the negative liquid crystal in a predetermined direction.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain the principles of the inventive concept.

The above and other advantages of the present disclosure will become readily apparent by reference to the following detailed description when considered in conjunction with the accompanying drawings.

DETAILED DESCRIPTION OF THE ILLUSTRATED EMBODIMENTS

Figure 1:
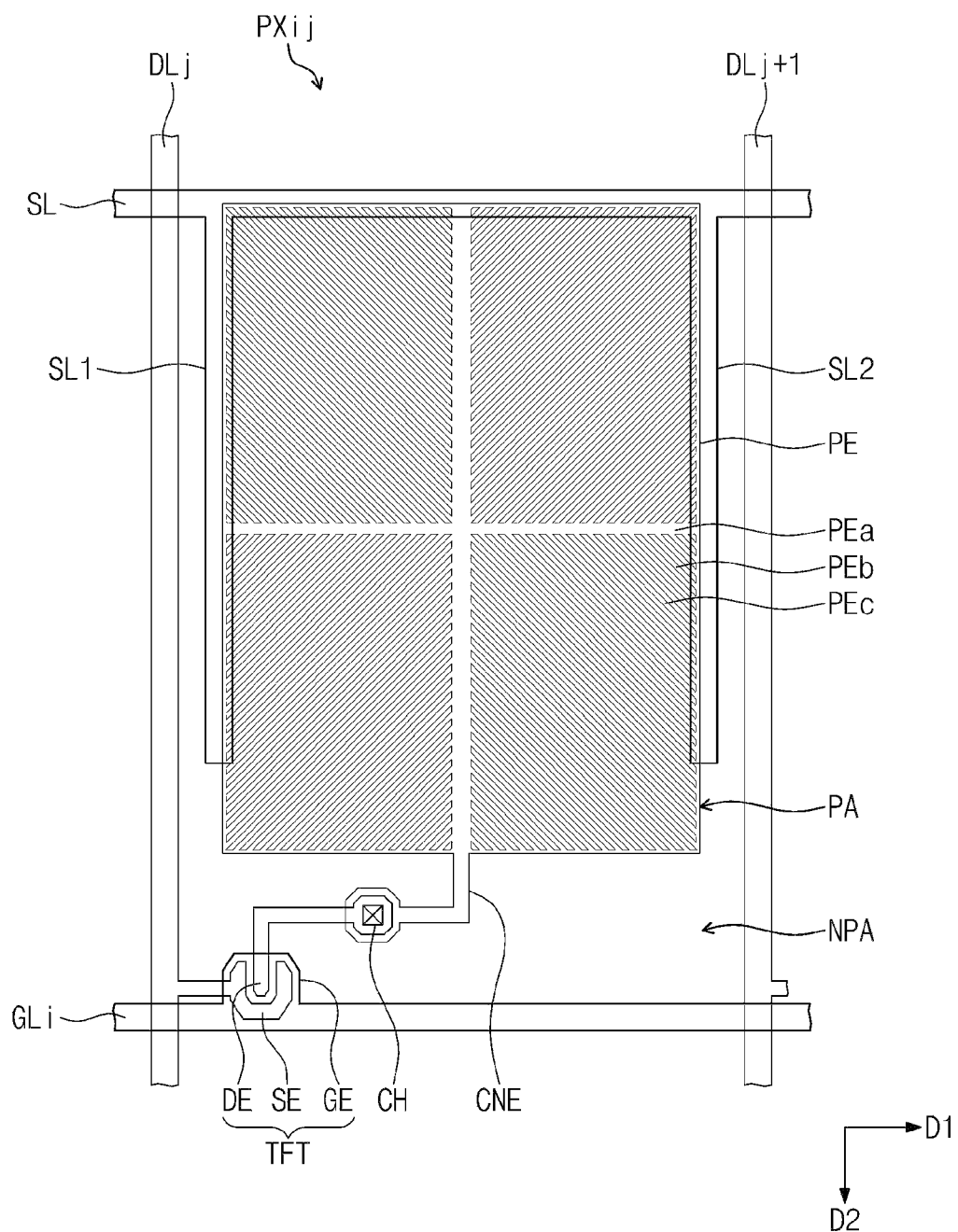
FIG. 1 is a plan view showing a pixel applied to a manufacturing method of a transparent display device according to exemplary embodiments of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature (s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments of the present invention will be explained in detail with reference to the accompanying drawings.

FIG. 1 is a plan view showing a pixel PXij of a transparent display device manufactured according to exemplary embodiments of the present disclosure.

Referring to FIG. 1, the pixel PXij includes a pixel area PA and a non-pixel area NPA disposed adjacent to the pixel area PA when viewed in a plan view. An image is displayed through the pixel area PA and no image is displayed in the non-display area NPA.

The pixel PXij is connected to a gate line GLi and a data line DLj. The pixel PXij is disposed between the data line DLj and an adjacent data line DLj+1, and between the gate line GLi and a storage line SL. The pixel PXij includes a thin film transistor TFT connected to the gate line GLi and the data line DLj, and a pixel electrode PE connected to the thin film transistor TFT. The thin film transistor TFT is disposed in the non-pixel area NPA, and the pixel electrode PE is disposed in the pixel area PA.

The gate line GLi extends in a first direction D1 and is disposed in the non-pixel area NPA. The data line DLj extends in a second direction D2 crossing the first direction D1 and is disposed in the non-pixel area NPA. The data line DLj crosses the gate line GLi and is insulated from the gate line GLi.

The thin film transistor TFT includes a gate electrode GE connected to the gate line GLi, a source electrode SE connected to the data line DLj, and a drain electrode DE connected to the pixel electrode PE.

The gate electrode GE of the thin film transistor TFT is branched from the gate line GLi. The source electrode SE is branched from the data line DLj. The drain electrode DE is electrically connected to the pixel electrode PE through a contact hole CH.

The pixel electrode PE is electrically connected to the drain electrode DE of the thin film transistor TFT by a connection electrode CNE branched from the pixel electrode PE. The connection electrode CNE is disposed in the non-pixel area NPA.

The thin film transistor TFT is turned on in response to a voltage provided through the gate line GLi to the gate electrode. The turned-on thin film transistor TFT applies a data voltage provided through the data line DLj to the pixel electrode PE.

The pixel PXij further includes a storage electrode part. The storage electrode part is formed by a storage line SL, a first branch electrode SL1, and a second branch electrode SL2, which are partially overlapped with the pixel electrode PE.

The storage line SL extends in the first direction D1 and is disposed to face the corresponding gate line GLi such that the pixel area PA is interposed between the storage line SL and the gate line GLi. For instance, the storage line SL is disposed at an upper portion of the pixel area PA, and the gate line GLi is disposed in the non-pixel area NPA disposed adjacent to a lower portion of the pixel area PA, such that the pixel PXij is disposed between the data line DLj and an adjacent data line DLj+1, and between the gate line GLi and the storage line SL.

The first and second branch electrodes SL1 and SL2 are branched from the storage line SL and extend in the second direction D2 while being spaced apart from each other. The first branch electrode SL1, the second branch electrode SL2, and a portion of the storage line SL disposed between the first branch electrode SL1 and the second branch electrode SL2, partially overlap the pixel electrode PE to form the storage electrode part.

The storage line SL receives a storage voltage or a common voltage. The storage line SL may be disposed on the same layer as the gate line GLi.

The pixel electrode PE includes a trunk portion PEa, a plurality of branch portions PEb, and a plurality of micro-slits PEc. The branch portions PEb are protruded and extend from the trunk portion PEa in a radial form. The trunk portion PEa may be provided in various shapes. As an example, the trunk portion PEa may have a cross shape as shown in FIG. 1. As shown in FIG. 1, the pixel PXij is divided into four domains by the trunk portion PEa, and the branch portions PEb extend away from the cross-shaped trunk portion PEa in parallel. For example, if the trunk portion PEa has a cross shape formed by two portions of the trunk portion PEa that cross at about a 90° angle, the branch portions PEb may extend away from the portions of the trunk portion PEa at about a 35° to 55° angle. However, aspects need not be limited thereto such that there may be other acceptable angles.

The branch portions PEb may extend in different directions in each domain. The branch portions PEb are arranged substantially in parallel to each other and spaced apart from each other in each domain, which are at least partially defined by the trunk portion PEa. The branch portions PEb, which are adjacent to each other, are spaced apart from each other by micrometer distances to form the micro-slits PEc.

The pixel electrode PE may include a transparent conductive material, such as indium tin oxide (ITO), indium zinc oxide (IZO), indium tin zinc oxide (ITZO), etc.

Although not shown in FIG. 1, a black matrix is disposed in the non-pixel area NPA. The black matrix blocks light in the non-pixel area NPA so as to provide a clearer image.

Figure 2:
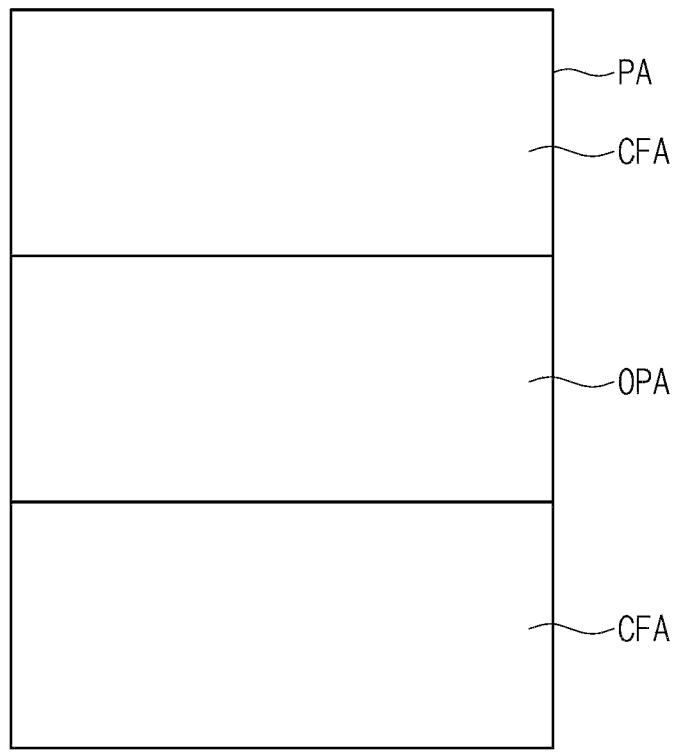
FIG. 2 is a view showing portions of a pixel area shown in FIG. 1 according to exemplary embodiments of the present disclosure.

FIG. 2 is a view showing portions of the pixel area PA shown in FIG. 1 according to exemplary embodiments of the present disclosure.

Referring to FIG. 2, the pixel area PA includes an open area OPA disposed between two color filter areas CFA. Although not shown in FIG. 2, a color filter is disposed in each of the color filter areas CFA. The color filters assign a color to the light passing through the pixel PXij.

Although not shown in FIG. 2, the color filters are not disposed in the open area OPA, and the open area OPA transmits the light. Accordingly, the definition of the image is improved by the open area OPA disposed in the pixel PXij.

A ratio of the open area OPA to the color filter areas CFA, a position of the open area OPA, and a shape of the open area OPA should not be limited to those shown in FIG. 2. For instance, the ratio of the open area OPA to the color filter areas CFA may be, for example, 1:0.5, 1:1, or 1:2. In addition, the open area OPA and the color filter areas CFA may have various shapes, e.g., a triangular shape, a pentagonal shape, hexagonal, etc.

Figure 3:
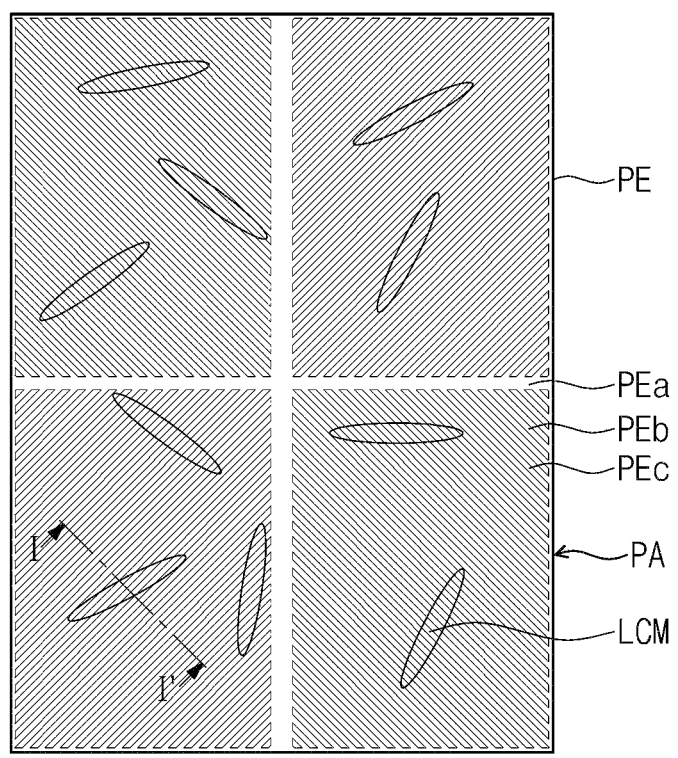
FIG. 3 is a view showing liquid crystal molecules arranged in the pixel area shown in FIG. 1 when viewed in a plan view according to exemplary embodiments of the present disclosure.
Figure 4:
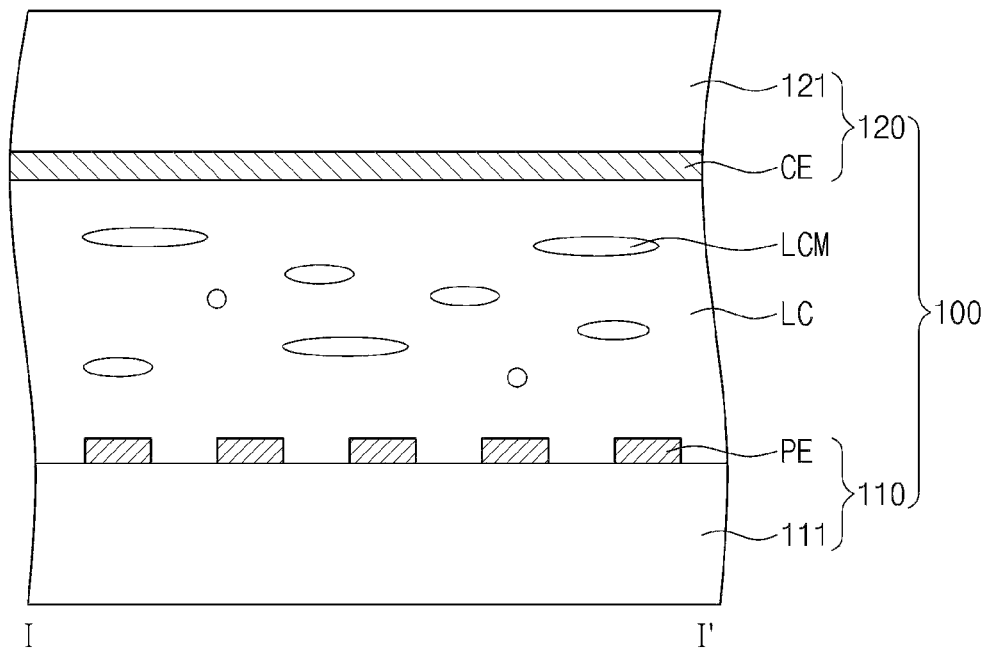
FIG. 4 is a cross-sectional view taken along a line I-I' shown in FIG. 3 according to exemplary embodiments of the present disclosure.

FIG. 3 is a view showing liquid crystal molecules arranged in the pixel area shown in FIG. 1 when viewed in a plan view according to exemplary embodiments of the present disclosure. FIG. 4 is a cross-sectional view taken along a line I-I' shown in FIG. 3 according to exemplary embodiments of the present disclosure.

For the convenience of explanation, FIG. 3 shows only the pixel electrode PE and the liquid crystal molecules LCM, which are disposed in the pixel area PA.

Referring to FIGS. 3 and 4, the pixel PXij of the display panel 100 is disposed between a first substrate 110 and a second substrate 120 facing the first substrate 110. The pixel PXij includes a liquid crystal layer LC interposed between the first substrate 110 and the second substrate 120.

The first substrate 110 includes a first base substrate 111 and the pixel electrode PE disposed on the first base substrate 111. Although not shown, the first base substrate 111 includes the thin film transistor TFT connected to the pixel electrode PE. In addition, the gate line GLi, the data line DLj, and the storage line SL are disposed on the first base substrate 111.

The second substrate 120 includes a second base substrate 121 and a common electrode CE disposed on the second base substrate 121 to face the pixel electrode PE. The common electrode CE includes a transparent conductive material, such as indium tin oxide, indium zinc oxide, indium tin zinc oxide, etc.

Although not shown, the second base substrate 121 includes the color filter and the black matrix. The open area OPA is disposed on the second base substrate 121.

The liquid crystal layer LC includes liquid crystal molecules LCM. The liquid crystal molecules LCM may be a dual frequency liquid crystal (DFLC) having a dielectric anisotropy that changes according to a frequency.

The DFLC is operated as a positive liquid crystal when a frequency (hereinafter, referred to as a low frequency) smaller than a reference frequency is applied to the DFLC. The reference frequency may be referred to as a crossover frequency. The DFLC is operated as a negative liquid crystal when a frequency (hereinafter, referred to as a high frequency) larger than the reference frequency is applied to the DFLC.

For instance, the reference or crossover frequency maybe about 18.5 KHz. When the frequency of the voltage applied to the liquid crystal layer LC is the low frequency, i.e., smaller than about 18.5 KHz, the liquid crystal layer LC is operated as the positive liquid crystal. When the frequency of the voltage applied to the liquid crystal layer LC is the high frequency, i.e., greater than about 18.5 KHz, the liquid crystal layer LC is operated as the negative liquid crystal.

When the liquid crystal layer LC is operated as the positive liquid crystal, a dielectric constant of long axes of the liquid crystal molecules LCM are larger than a dielectric constant of short axes of the liquid crystal molecules LCM. When the liquid crystal layer LC is operated as the negative liquid crystal, the dielectric constant of the long axes of the liquid crystal molecules LCM are smaller than the dielectric constant of the short axes of the liquid crystal molecules LCM.

When the transparent display device is manufactured, the display panel 100 including the pixel PXij shown in FIG. 1 is prepared. In addition, the liquid crystal molecules LCM of the liquid crystal layer LC included in the display panel 100 are randomly arranged as shown in FIGS. 3 and 4 without being directed to a specific direction.

Figure 5:
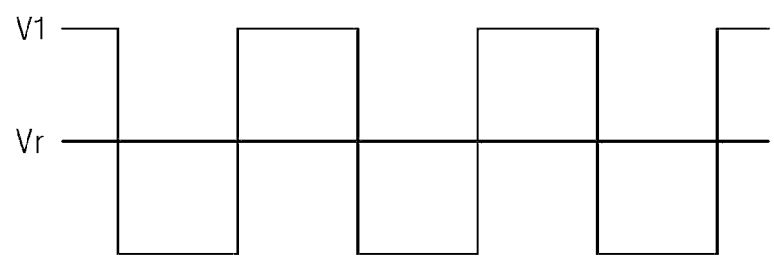
FIG. 5 is a waveform diagram showing a voltage applied to a liquid crystal layer, which has a low frequency, according to exemplary embodiments of the present disclosure.
Figure 6:
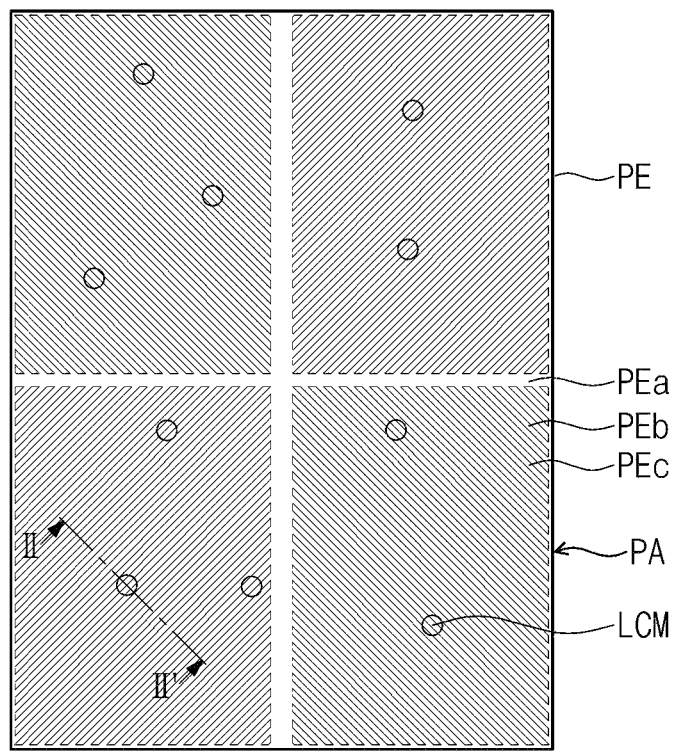
FIG. 6 is a plan view showing a pixel area including liquid crystal molecules realigned by the voltage shown in FIG. 5 according to exemplary embodiments of the present disclosure.
Figure 7:
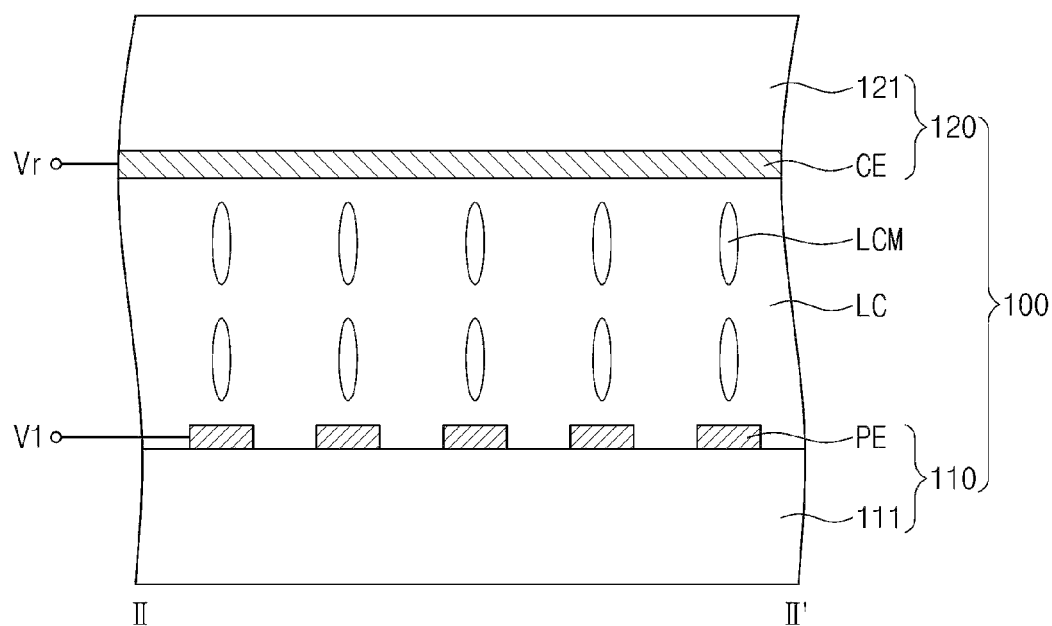
FIG. 7 is a cross-sectional view taken along a line II-II' shown in FIG. 6 according to exemplary embodiments of the present disclosure.

FIGS. 5 through 11 illustrate a method of manufacturing a transparent display device according to aspects of the present invention. FIG. 5 is a waveform diagram showing a voltage applied to a liquid crystal layer, which has a low frequency, according to exemplary embodiments of the present disclosure. FIG. 6 is a plan view showing a pixel area including liquid crystal molecules realigned by the voltage shown in FIG. 5 according to exemplary embodiments of the present disclosure. FIG. 7 is a cross-sectional view taken along a line II-II' shown in FIG. 6 according to exemplary embodiments of the present disclosure. In detail, FIG. 7 shows the liquid crystal molecules aligned by the voltage shown in FIG. 5.

Referring to FIGS. 5, 6, and 7, a reference voltage Vr and a first voltage V1 are applied to the liquid crystal layer LC. In detail, the reference voltage Vr having a predetermined direct current component is applied to the common electrode CE as shown in FIG. 7. The first in voltage V1 is applied to the pixel electrode PE as shown in FIG. 7. The liquid crystal layer LC is operated in response to the reference voltage Vr and the first voltage V1 respectively applied to the common electrode CE and the pixel electrode PE.

As described with reference to FIG. 1, the thin film transistor is turned on in response to the voltage applied thereto through the gate line. The turned-on thin film transistor receives the first voltage V1 through the data voltage and applies the first voltage V1 to the pixel electrode PE.

The first voltage V1 has the low frequency, i.e., smaller than about 18.5 KHz. The liquid crystal layer LC is operated as the positive liquid crystal by the first voltage V1 having the low frequency. When the liquid crystal layer LC is operated as the positive liquid crystal, the liquid crystal molecules LCM are aligned such that the long axes of the liquid crystal molecules LCM are substantially vertical to the pixel electrode PE and the common electrode CE.

Therefore, when the liquid crystal layer LC is applied with the reference voltage Vr and the first voltage V1 having the low frequency, the liquid crystal molecules LCM are aligned such that the long axes of the liquid crystal molecules LCM are substantially vertical to the pixel electrode PE and the common electrode CE as shown in FIGS. 6 and 7. The application of the reference voltage Vr and the first voltage V1 align the liquid crystal molecules LCM, which may allow for greater alignment of the liquid crystal molecules LCM during application of the reference voltage Vr and the second voltage V2.

Figure 8:
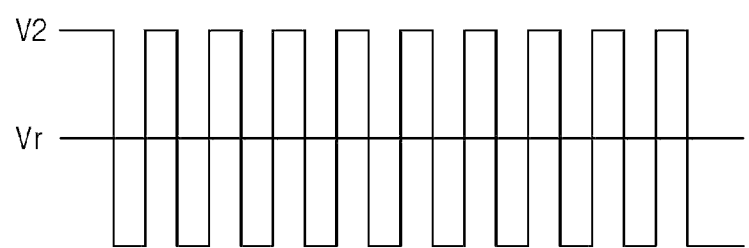
FIG. 8 is a waveform diagram showing a voltage applied to a liquid crystal layer, which has a high frequency, according to exemplary embodiments of the present disclosure.
Figure 9:
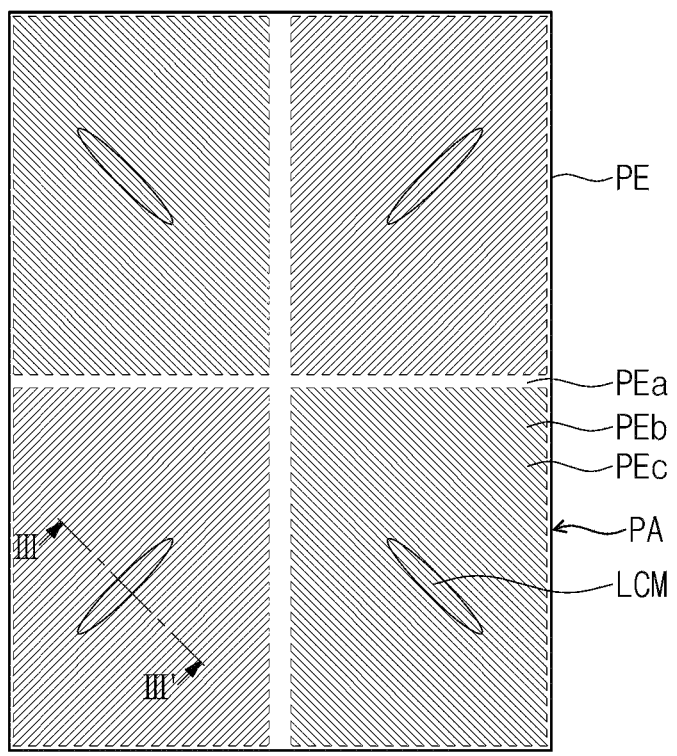
FIG. 9 is a plan view showing a pixel area including liquid crystal molecules realigned by the voltage shown in FIG. 8 according to exemplary embodiments of the present disclosure.
Figure 10:
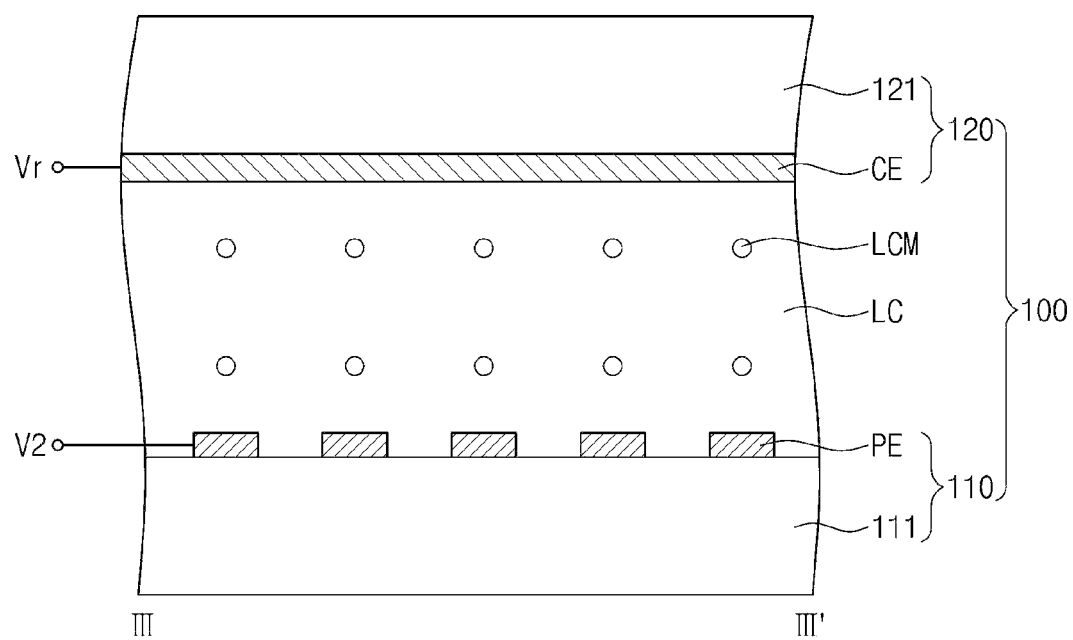
FIG. 10 is a cross-sectional view taken along a line III-III' shown in FIG. 9 according to exemplary embodiments of the present disclosure.

FIG. 8 is a waveform diagram showing a voltage applied to a liquid crystal layer, which has a high frequency, according to exemplary embodiments of the present disclosure. FIG. 9 is a plan view showing a pixel area including liquid crystal molecules realigned by the voltage shown in FIG. 8 according to exemplary embodiments of the present disclosure. FIG. 10 is a cross-sectional view taken along a line III-III' shown in FIG. 9 according to exemplary embodiments of the present disclosure. In detail, FIG. 10 shows the liquid crystal molecules realigned by the voltage shown in FIG. 8.

Referring to FIGS. 8, 9, and 10, the reference voltage Vr and a second voltage V2 are applied to the liquid crystal layer LC. In detail, the reference voltage Vr is applied to the common electrode CE and the second voltage V2 is applied to the pixel electrode PE. The liquid crystal layer LC is operated by the reference voltage Vr and the second voltage V2 respectively applied to the common electrode CE and the pixel electrode PE.

As described with reference to FIG. 1, the thin film transistor, which is turned on by the voltage applied thereto through the gate line, receives the second voltage V2 through the data line and applies the second voltage V2 to the pixel electrode PE.

The second voltage V2 has the high frequency greater than about 18.5 KHz. The liquid crystal layer LC is operated as the negative liquid crystal by the second voltage V2 having the high frequency. When the liquid crystal layer LC is operated as the negative liquid crystal, the liquid crystal molecules LCM are aligned such that the long axes of the liquid crystal molecules LCM are substantially in parallel to the pixel electrode PE and the common electrode CE.

Thus, when the liquid crystal layer LC is applied with the reference voltage Vr and the second voltage V2 having the high frequency, the liquid crystal molecules LCM are aligned such that the long axes of the liquid crystal molecules LCM are substantially in parallel to the pixel electrode PE and the common electrode CE as shown in FIGS. 9 and 10.

In addition, due to the micro-slits PEc of the pixel PXij, the liquid crystal molecules LCM are aligned in different directions in each domain defined by the trunk portion PEa as shown in FIG. 9. The liquid crystal molecules LCM are aligned in the direction substantially in parallel to the micro-slits PEc in each domain defined by the trunk portion PEa.

Figure 11:
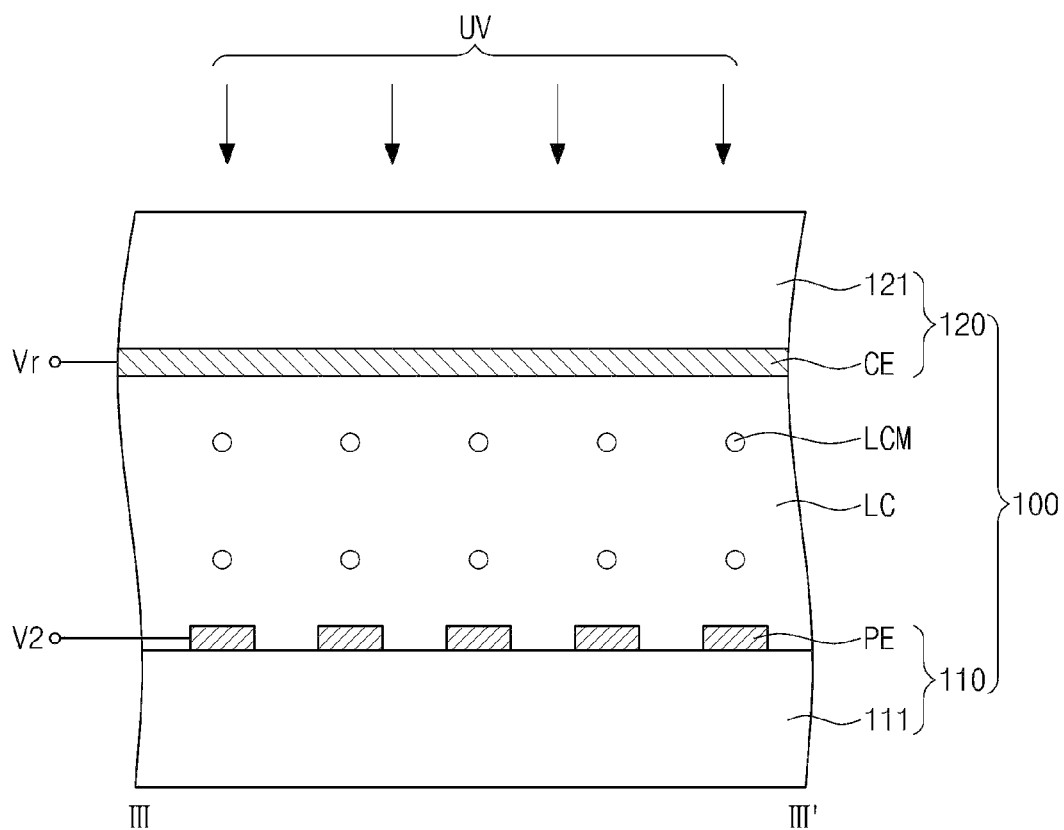
FIG. 11 is a cross-sectional view showing an ultraviolet ray applied to the display panel shown in FIG. 10 according to exemplary embodiments of the present disclosure.

FIG. 11 is a cross-sectional view showing an ultraviolet ray applied to the display panel shown in FIG. 10 according to exemplary embodiments of the present disclosure.

Referring to FIG. 11, the ultraviolet radiation UV is radiated to the liquid crystal molecules LCM aligned as shown in FIGS. 9 and 10 according to exemplary embodiments of the present disclosure.

Although not shown in figures, the liquid crystal layer LC may further include a reactive mesogen. The reactive mesogen includes a material or a compound that contains a mesogen group with a bar shape, a plate shape, or a disc shape, which causes liquid crystalline phase behavior.

The reactive mesogen may be polymerized by light, e.g., ultraviolet radiation, and the polymerized reactive mesogen may be aligned in accordance with an alignment state of adjacent material thereto. Due to the polymerized reactive mesogen, directivity of the liquid crystal molecules LCM is set, and the pre-tilt angle of the liquid crystal molecules LCM is controlled. Accordingly, the liquid crystal molecules LCM of the liquid crystal layer LC may be pre-tilted in directions substantially in parallel to the micro-slits PEc in each domain as shown in FIG. 11. The ultraviolet radiation UV may be applied after, while, or at substantially the same time as the second voltage V2 having a frequency higher than the reference frequency is applied to the liquid crystal molecules LCM of the liquid crystal layer LC.

Figure 12:
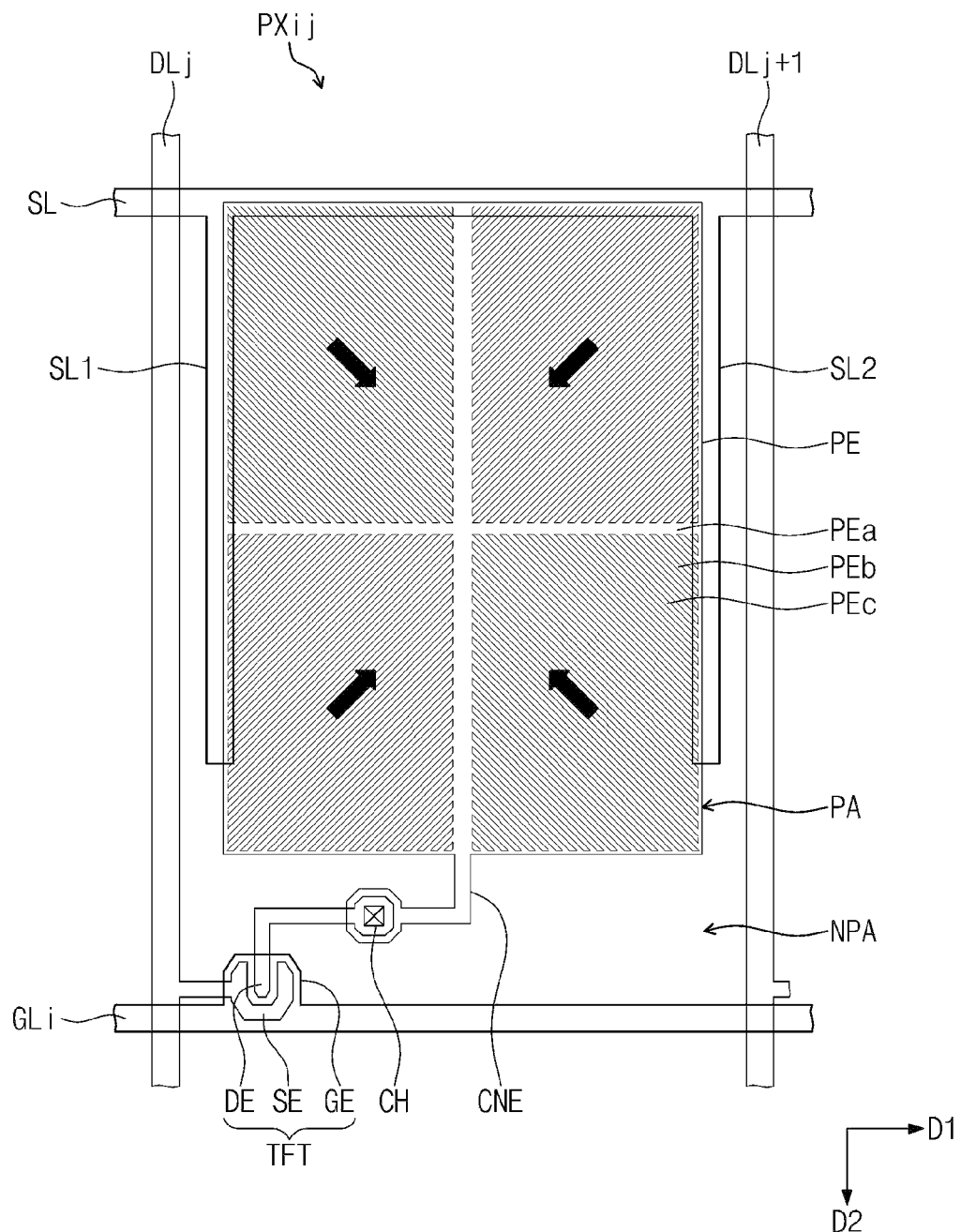
FIG. 12 is a plan view showing a pixel area including liquid crystal molecules pre-tilted by the irradiation of the ultraviolet radiation shown in FIG. 11 according to exemplary embodiments of the present disclosure.

FIG. 12 is a plan view showing a pixel area including liquid crystal molecules pre-tilted by the irradiation of the ultraviolet radiation shown in FIG. 11 according to exemplary embodiments of the present disclosure.

The liquid crystal molecules LCM of the liquid crystal layer LC of the pixel PXij are pre-tilted in different directions according to each domain by the micro-slits PEc of the pixel electrode PE. For instance, the liquid crystal molecules LCM may be inclined in four directions towards the trunk portion PEa as shown in FIG. 12. Accordingly, four domains in which the alignment directions of the liquid crystal molecules LCM are different are formed in the liquid crystal layer LC.

As described above, when the directions to which the liquid crystal molecules LCM are inclined are varied, a reference viewing angle of the transparent display device including the liquid crystal layer LC may be broadened.

The pixel PXij of the transparent display device manufactured by the above-mentioned method is operated in the normally white mode, and, the thin film transistor Tr may be turned on in response to the gate signal applied thereto through the gate line GLi.

The turned-on thin film transistor TFT receives the data voltage through the data line DLj. The data voltage is applied to the pixel electrode PE through the turned-on thin film transistor TFT. The common voltage is applied to the common electrode CE.

The applied data voltage may have a low frequency, i.e., below the reference frequency of the liquid crystal molecules LCM of the liquid crystal layer LC. For instance, the data voltage applied to the pixel electrode PE may have a frequency of about 60 Hz. Therefore, the liquid crystal layer LC is operated as the positive liquid crystal. The liquid crystal molecules LCM are aligned such that the long axes of the liquid crystal molecules LCM are inclined or disposed at about 90 degrees with respect to the pixel electrode PE and the common electrode CE by the data voltage.

Although not shown in figures, the display panel 100 may further a polarizer disposed under the first substrate 110 and a polarizer disposed on the second substrate 120 and having an optical axis substantially perpendicular to an optical axis of the polarizer disposed under the first substrate 110.

In this case, the light polarized by the polarizer disposed under the display panel 100 is blocked by the polarizer disposed on the display panel 100 after passing through the liquid crystal layer LC. That is, the display panel 100 is operated in the black mode in response to the data voltage.

During the off state in which the gate signal and the data voltage are not applied to the display panel 100, the display panel 100 transmits the light. That is, the display panel 100 is operated in the normally white mode.

Since the display panel 100 is operated in the normally white mode, a power consumption of the display panel 100 is reduced. In addition, the display panel 100 is operated in the normally white mode without using any phase retardation film, and thus the light transmittance of the display panel 100 is improved.

Figure 13:
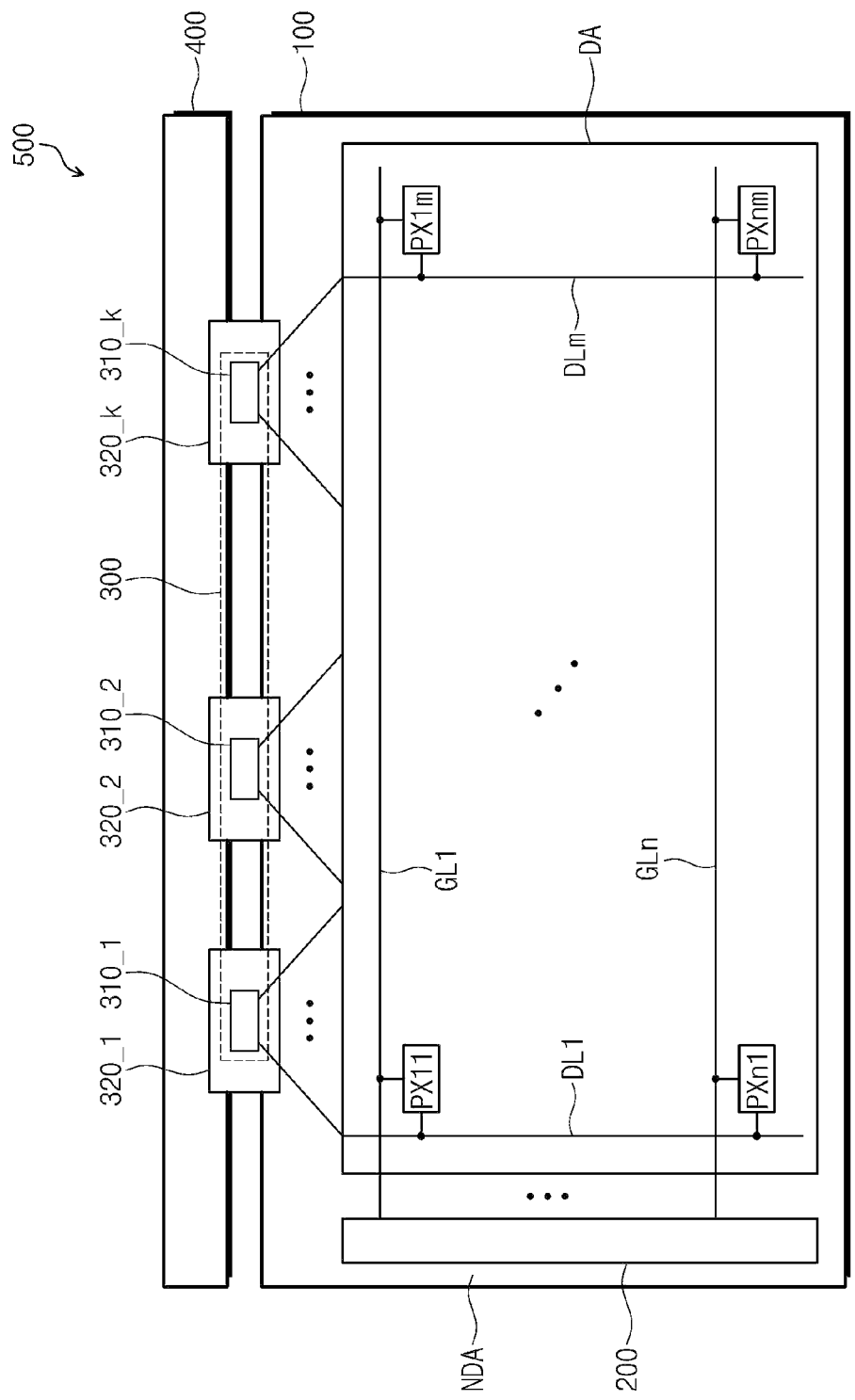
FIG. 13 is a plan view showing a transparent display device manufactured according to exemplary embodiments of the present disclosure.

FIG. 13 is a plan view showing a transparent display device manufactured according to exemplary embodiments of the present disclosure.

Referring to FIG. 13, a transparent display device 500 includes a display panel 100, a gate driver 200, a data driver 300, and a driving circuit board 400.

The display panel 100 includes a plurality of pixels PX11 to PXnm, a plurality of gate lines GL1 to GLn, and a plurality of data lines DL1 to DLm. The display panel 100 includes a display area DA and a non-display area NDA disposed adjacent to the display area DA when viewed in a plan view.

The pixels PX11 to PXnm are arranged in the display area DA in a matrix form. For instance, the pixels PX11 to PXnm are arranged in n rows by m columns, the rows crossing the columns. Each of "n" and "m" is an integer number greater than zero (0). Each pixel PX11 to PXnm has the same structure as those of the pixel PXij shown in FIG. 1.

The gate lines GL1 to GLn are insulated from the data lines DL1 to DLm while crossing the data lines DL1 to DLm. The gate lines GL1 to GLn are connected to the gate driver 200 and sequentially receive gate signals from the gate driver 200. The data lines DL1 to DLm are connected to the data driver 300 and receive data voltages in analog form from the data driver 300.

Each of the pixels PX11 to PXnm is connected to a corresponding gate line of the gate lines GL1 to GLn and a corresponding data line of the data lines DL1 to DLm. Each of the pixels PX11 to PXnm receives the data voltage through the corresponding data line of the data lines DL1 to DLm in response to the gate signal applied through the corresponding gate line of the gate lines GL1 to GLn. The pixels PX11 to PXnm display gray scales corresponding to the data voltages.

The gate driver 200 generates the gate signals in response to a gate control signal applied from a timing controller (not shown) mounted on the driving circuit board 400. The gate signals are sequentially applied to the pixels PX11 to PXnm through the gate lines GL1 to GLn in the unit of a row, i.e., the gate lines GL1 to GLn are driven by row. Thus, the pixels PX11 to PXnm are driven in the unit of row, i.e., the pixels PX11 to PXnm are driven by row.

The gate driver 200 is disposed in the non-display area NDA disposed adjacent to a side of the display area DA. For example, the gate driver may be disposed in the non-display area NDA adjacent to the left side of the display area DA. Further, the gate driver 200 may be mounted on the non-display area NDA in an amorphous silicon TFT gate driver circuit (ASG) form.

However, the gate driver 200 should not be limited thereto or thereby. That is, the gate driver 200 may include a plurality of gate driving chips. The gate driving chips may be mounted on the non-display area NDA in a chip on glass (COG) manner, or the gate driving chips may be connected to the non-display area NDA in a tape carrier package (TCP) manner.

The data driver 300 receives image signals and a data control signal from the timing controller (not shown) mounted on the driving circuit board 400. The data driver 300 generates the data voltages in analog form, which correspond to the image signals, in response to the data control signal. The data driver 300 applies the data voltages to the pixels PX11 to PXnm through the data lines DL1 to DLm.

The data driver 300 includes a plurality of source driving chips 310_1 to 310_k. "k" is an integer number greater than zero (0) and less than or equal to "m". Each of the source driving chips 310_1 to 310_k is mounted on a corresponding flexible circuit board 320_1 to 320_k and connected between the driving circuit board 400 and the non-display area NDA disposed adjacent to a side of the display area DA. The data driver 300 may be disposed in the non-display area NDA at an upper portion of the display area DA and connected to the display panel 100 in the tape carrier package (TCP) manner.

However, it should not be limited thereto or thereby. That is, the source driving chips 310_1 to 310_k may be mounted on the non-display area NDA disposed adjacent to the upper portion of the display area DA in the chip on glass (COG) manner.

The transparent display device 500 according to exemplary embodiments is operated in the normally white mode such that the power consumption of the transparent display device 500 is reduced. In addition, the transparent display device 500 is operated in the normally white mode without using any phase retardation film, and thus a transmittance of the light passing through the transparent display device 500 is improved.

Consequently, the light transmittance of the transparent display device manufactured by the above-mentioned method may be improved.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of manufacturing a transparent display device, the method comprising:
   forming a pixel between a first substrate and a second substrate facing the first substrate, the pixel comprising a liquid crystal layer disposed between the first and second substrates;
   applying a first voltage having a frequency lower than a reference frequency to the liquid crystal layer to drive liquid crystal molecules of the liquid crystal layer as positive liquid crystal molecules;
   applying a second voltage having a frequency higher than the reference frequency to the liquid crystal layer to drive the liquid crystal molecules of the liquid crystal layer as negative liquid crystal molecules; and
   pre-tilting the liquid crystal molecules operated as the negative liquid crystal in a predetermined direction.

2. The method of claim 1, wherein the liquid crystal molecules are dual frequency liquid crystal molecules having a dielectric anisotropy that is changed in accordance with the frequency of the voltage applied to the liquid crystal layer.

3. The method of claim 1, wherein the reference frequency is about 18.5 KHz.

4. The method of claim 1, wherein the first substrate comprises a first base substrate, and a pixel electrode disposed on the first base substrate to correspond to the pixel, and
   the second substrate comprises a second base substrate, and a common electrode disposed under the second base substrate to face the pixel electrode.

5. The method of claim 4, wherein a reference voltage having a predetermined direct current component is applied to the common electrode and the first and second voltages are applied to the pixel electrode.

6. The method of claim 5, wherein the first base substrate comprises:
   a thin film transistor connected to the pixel electrode; and
   gate and data lines connected to the thin film transistor,
   wherein the thin film transistor is configured to be turned on in response to a voltage applied to the thin film transistor through the gate line, and the thin film transistor is configured to apply the first and second voltages to the pixel electrode.

7. The method of claim 4, wherein the driving of the liquid crystal molecules as the positive liquid crystal molecules comprises driving the liquid crystal molecules such that long axes of the liquid crystal molecules are aligned to be substantially vertical to the pixel electrode and the common electrode.

8. The method of claim 4, wherein the driving of the liquid crystal molecules as the negative liquid crystal molecules comprises driving the liquid crystal molecules such that long axes of the liquid crystal molecules are aligned to be substantially parallel to the pixel electrode and the common electrode.

9. The method of claim 4, wherein the pixel electrode comprises:
   a trunk portion having a cross shape that divides a pixel area of the pixel in which the pixel electrode is disposed into a plurality of domains; and
   a plurality of branch portions that extend from the trunk portion, the branch portions extending in different directions in each domain, the branch portions being arranged substantially in parallel to each other within each domain, and the branch portions being spaced apart from each other; and
   a plurality of micro-slits disposed between the branch portions.

10. The method of claim 9, wherein the liquid crystal molecules are arranged in a direction substantially parallel to the micro-slits in each domain when the liquid crystal molecules are operated as the negative liquid crystal molecules.

11. The method of claim 9, wherein the liquid crystal molecules are pre-tilted in the direction substantially parallel to the micro-slits in each domain.

12. The method of claim 9, wherein the pixel area comprises:
   a color filter area that assigns a color to a light passing through the pixels; and
   an open area that transmits light passing through the pixels.

13. The method of claim 1, wherein the pixel comprising the liquid crystal molecules pre-tilted in the predetermined direction are operated in a normally white mode.

14. The method of claim 1, wherein the pre-tilting the liquid crystal molecules comprises radiating ultraviolet radiation onto the display panel.

15. A method of manufacturing a transparent display device, the transparent display device comprising a first substrate, a second substrate facing the first substrate, and a liquid crystal layer disposed between the first and second substrates, the method comprising:
   applying a voltage to the liquid crystal layer at a frequency greater than a crossover frequency of liquid crystal molecules of the liquid crystal layer; and
   radiating ultraviolet radiation onto the liquid crystal layer to polymerize a mesogen of the liquid crystal layer.

16. The method of claim 15, wherein the crossover frequency of the liquid crystal molecules is about 18.5 KHz.

17. The method of claim 15, wherein the applying the voltage to the liquid crystal layer drives the liquid crystal molecules of the liquid crystal layer as negative liquid crystal molecules.

18. The method of claim 15, wherein the applying the voltage to the liquid crystal layer aligns the liquid crystal molecules of the liquid crystal layer to be substantially parallel with the first and second substrates.

* * * * *